W. A. HOLCOMB.
WIRE STRETCHING DEVICE.
APPLICATION FILED MAY 5, 1911.
1,015,184.
Patented Jan. 16, 1912.
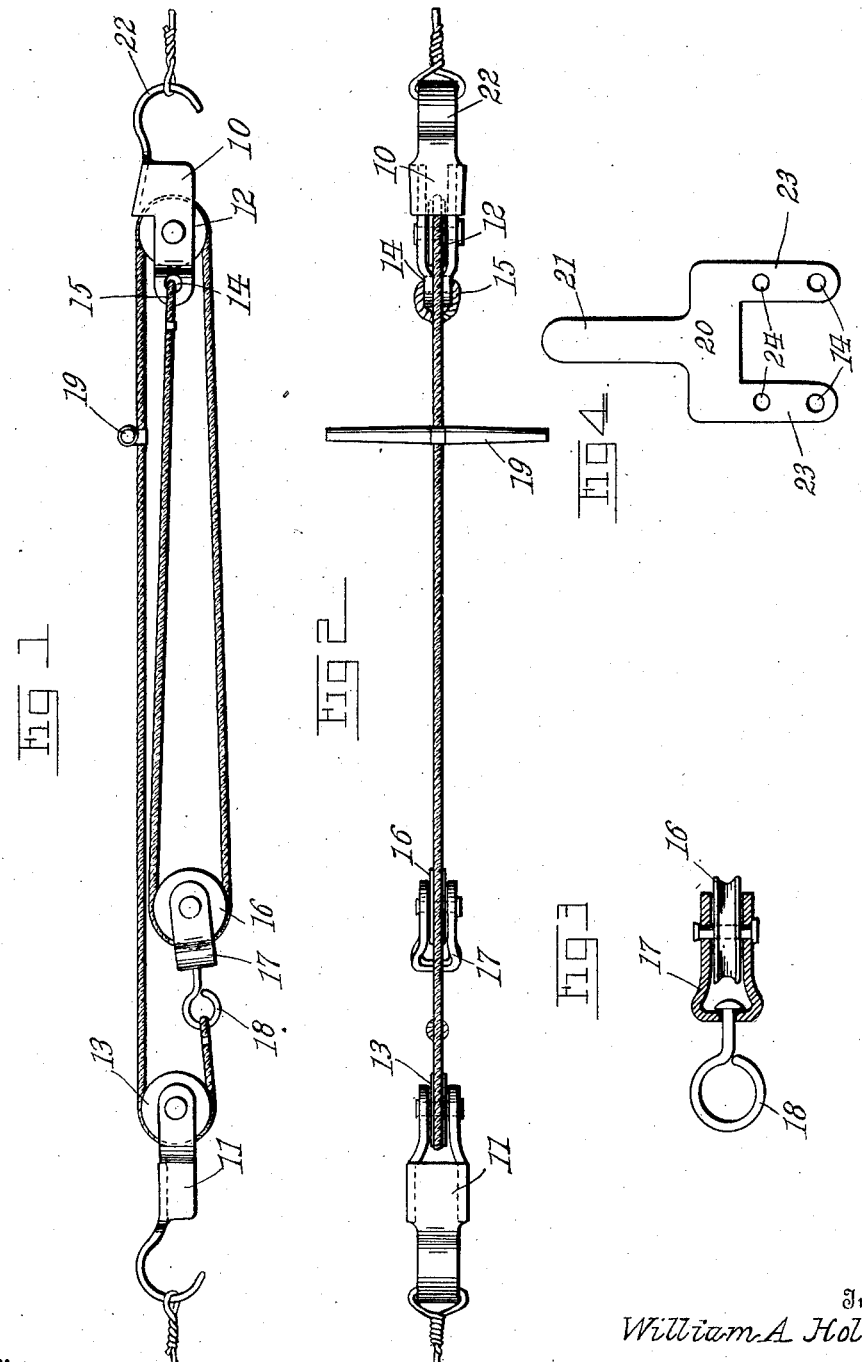
Inventor
William A. Holcomb
Witnesses
By Victor J. Evans
Attorney

UNITED STATES PATENT OFFICE.

WILLIAM A. HOLCOMB, OF PEBWORTH, KENTUCKY.

WIRE-STRETCHING DEVICE.

1,015,184.  Specification of Letters Patent.  Patented Jan. 16, 1912.

Application filed May 5, 1911.  Serial No. 625,206.

*To all whom it may concern:*

Be it known that I, WILLIAM A. HOLCOMB, a citizen of the United States, residing at Pebworth, in the county of Owsley and State of Kentucky, have invented new and useful Improvements in Wire-Stretching Devices, of which the following is a specification.

An object of the invention is to provide a device for stretching wire to releasably retain the same in tension.

To accomplish the desired result, use is made of a plurality of hooks provided with pulleys, one of the hooks having a cord secured thereto, the said cord passing over a pulley block and over the pulley mounted on the hook having the end of the cord attached thereto, the said cord then passing over the pulley of the other hooked member and having the end of the cord attached to the mentioned pulley block and a handle secured to the cord between the hooks.

Reference is to be had to the accompanying drawings constituting a part of this specification, in which similar characters of reference denote corresponding parts in all the views, and in which—

Figure 1 is a side elevation. Fig. 2 is a plan view. Fig. 3 is a sectional view through the pulley block. Fig. 4 is a plan view of a blank from which the hooks are fashioned.

Referring more particularly to the views I provide hooks 10, 11 having pulleys 12, 13 rotatably mounted thereon and the hook 10 is provided with a plurality of registering apertures 14 through which is extended the end of a cord 15, the said end being secured to the hook 10. The cord 15 is first passed over a pulley 16 of a pulley block 17 and the said cord is then passed over the pulley 12 after which the cord is passed over the pulley 13 of the hook 11 and the other end of the cord is secured to an eye 18 pivotally mounted on the pulley block 17. Conveniently secured to the cord 15 between the hooks 10, 11 is a handle 19. The hook 10 is preferably formed of a blank 20 having an extension 21 adapted to form the hooked portion 22 of the hook 10 and provided with similar extensions 23 adapted to be bent so that the apertures 24 therein will register and mounted in the apertures is the pulley 12, the apertures 14 being also adapted to register as shown in Fig. 1 and having the ends of the cord 15 passed therethrough. The hook 11 is made of a blank similar to the blank 20 with the exception that the apertures 14 are omitted and the pulley 13 is journaled on the hook 11 as has been heretofore mentioned. The pulley block 17 consists preferably of an integral piece of material bent in a U-shaped form and having the pulley 16 revolubly mounted thereon, the said pulley block being provided with an opening through which is extended the eye 18, the inner end of the eye being enlarged so that the same will be retained on the pulley block and will be pivotally mounted relatively thereto.

In the use of my device, when it is desired to relatively stretch the ends of wires so as to move the same toward each other, an end of one of the wires is secured to the hook 10 and an end of the other wire is secured to the hook 11. Now assuming that the pulley block 17 is in a position adjacent the hook 10 and the handle 19 is in a position adjacent the hook 11, my device will be extended to its fullest length as will be readily understood. After the wires have been secured to the hooks as mentioned, the handle 19 is grasped and moved toward the hook 10, so that the pulley block 17 will move toward the hook 11, thus tending to shorten the distance between the hooks 10 and 11 in that the cord will be doubled up owing to the movement of the pulley block toward the hook 11.

Having thus fully described the invention, what I claim as new, is:—

1. A device of the class described comprising a hook, a pulley mounted thereon, a block, a pulley mounted on the said block, a cord secured to the said hook and extending over the pulley on the said block, the said cord being then passed over the pulley on the said hook, a second hook, and a pulley mounted on the second hook and having the cord passed thereover, the said cord being then secured to the said block.

2. A device of the class described comprising a hook, a pulley mounted thereon, a block, a pulley mounted on the said block, a cord secured to the said hook and extending over the pulley on the said block, the said cord being then passed over the pulley on the said hook, a second hook, a pulley mounted on the second hook and having the cord passed thereover, the said cord being then secured to the said block, and a handle secured to the said cord between the said hooks.

3. A device of the class described comprising a plurality of hooks, a cord secured to one of the hooks, a block, a pulley mounted on the said block and having the cord passed thereover, pulleys mounted on the said hooks, the said cord being passed over the pulley on the hook having the end of the cord secured thereto and the said cord being then passed over the pulley on the other said hook, and an eye pivotally mounted on the said block and having the other end of the said cord secured thereto.

4. A device of the class described comprising a plurality of hooks, a cord secured to one of the hooks, a block, a pulley mounted on the said block and having the cord passed thereover, pulleys mounted on the said hooks, the said cord being passed over the pulley on the hook having the end of the cord secured thereto and the said cord being then passed over the pulley on the other said hook, an eye pivotally mounted on the said block and having the other end of the said cord secured thereto, and a handle secured to said cord and positioned between the said hooks.

5. A device of the class described comprising a plurality of attaching members, each formed of an integral piece of material, pulleys mounted on the said attaching members, a block, a pulley mounted on the said block and a cord having an end thereof secured to one of the attaching members and passed over the pulley on the said block, the said cord being then successively passed over the pulleys on the attaching members with the other end of the said cord secured to the said block.

In testimony whereof I affix my signature in presence of two witnesses.

WILLIAM A. HOLCOMB.

Witnesses:
E. E. HOGG,
P. M. FRYE.

---

Copies of this patent may be obtained for five cents each, by addressing the "Commissioner of Patents, Washington, D. C."